(12) United States Patent
Cheng et al.

(10) Patent No.: US 11,703,705 B2
(45) Date of Patent: Jul. 18, 2023

(54) LIQUID CRYSTAL DISPLAY PANEL AND SMART TERMINAL PROVIDED WITH THE SAME

(71) Applicant: BEIJING XIAOMI MOBILE SOFTWARE CO., LTD., Beijing (CN)

(72) Inventors: Chih-jen Cheng, Beijing (CN); Che-jui Hsu, Beijing (CN); Tsang-chih Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 191 days.

(21) Appl. No.: 16/872,367

(22) Filed: May 12, 2020

(65) Prior Publication Data

US 2021/0110134 A1     Apr. 15, 2021

(30) Foreign Application Priority Data

Oct. 12, 2019 (CN) .......................... 201910968083.6

(51) Int. Cl.
*G02F 1/1335*     (2006.01)
*G02F 1/1333*     (2006.01)

(52) U.S. Cl.
CPC .... *G02F 1/133514* (2013.01); *G02F 1/13338* (2013.01); *G02F 1/133512* (2013.01)

(58) Field of Classification Search
CPC .............. G02F 1/13312; G02F 1/13318; G02F 1/13338; G02F 1/133512; G02F 1/133514; G02F 2201/52; G02F 2201/58
See application file for complete search history.

(56) References Cited

U.S. PATENT DOCUMENTS

2008/0036951 A1     2/2008 Tsai et al.
2009/0115952 A1*    5/2009 Nakamura ............. G09G 5/026
                                                                349/143
(Continued)

FOREIGN PATENT DOCUMENTS

CN      108415188 A  *  8/2018  ........... G02F 1/1333
CN      108415188 A      8/2018
(Continued)

OTHER PUBLICATIONS

Extended European Search Report in Application No. 20178976, dated Sep. 25, 2020.
(Continued)

*Primary Examiner* — Edward J Glick
*Assistant Examiner* — David Y Chung
(74) *Attorney, Agent, or Firm* — Syncoda LLC; Feng Ma

(57) ABSTRACT

A liquid crystal display panel includes a first transparent glass layer; a second transparent glass layer overlapping the first transparent glass layer; two or more pixel units disposed on a side of the first transparent glass layer opposite to the second transparent glass layer, each of the pixel units including a red sub-pixel, a green sub-pixel, a blue sub-pixel, and a white sub-pixel arranged in accordance with a predetermined rule; a black matrix disposed between the pixel units to isolate two pixel units adjacent to each other; and a fingerprint sensor disposed on the second transparent glass layer, and covered by the black matrix; when the fingerprint sensor is viewed from the top, an area of the fingerprint sensor corresponding to a region of the red sub-pixels is larger than any one of areas of the fingerprint sensors corresponding to respective regions of the green, blue, and white sub-pixels.

20 Claims, 4 Drawing Sheets

(56) References Cited

U.S. PATENT DOCUMENTS

2010/0220269 A1    9/2010  Takama et al.
2011/0057908 A1*   3/2011  Park .................. G06F 3/042
                                                349/24

FOREIGN PATENT DOCUMENTS

| CN | 108596147 A |   | 9/2018  |        |             |
|----|-------------|---|---------|--------|-------------|
| CN | 110161739 A |   | 8/2019  |        |             |
| CN | 110309775 A |   | 10/2019 |        |             |
| CN | 110310573 A |   | 10/2019 |        |             |
| JP | 2017134828 A | * | 8/2017 | ....... | G02F 1/133371 |

OTHER PUBLICATIONS

CN first office action in Application No. 201910968083.6, dated Mar. 30, 2022.

* cited by examiner

LIQUID CRYSTAL DISPLAY PANEL AND SMART TERMINAL PROVIDED WITH THE SAME

CROSS-REFERENCE TO RELATED APPLICATIONS

This application claims priority to Chinese Patent Application 201910968083.6 filed on Oct. 12, 2019, the disclosure of which is hereby incorporated by reference in its entirety.

BACKGROUND

As smart terminal devices such as mobile phones and tablet computers gradually become indispensable products for people's work and life, people's demand for smart terminal devices has gradually raised. The display ratio of smart terminal devices with a full-screen display is large so that it has become an important factor for people to consider when purchasing smart terminal devices.

SUMMARY

The present disclosure relates to the technical field of liquid crystal display, and more specifically, to a liquid crystal display panel and a smart terminal provided with the same.

According to a first aspect of embodiments of the present disclosure, there is provided a liquid crystal display panel, including: a first transparent glass layer; a second transparent glass layer overlapping the first transparent glass layer; two or more pixel units disposed on a side of the first transparent glass layer that is opposite to the second transparent glass layer, each of the pixel units including a red sub-pixel, a green sub-pixel, a blue sub-pixel, and a white sub-pixel arranged in accordance with a predetermined rule; a black matrix disposed between the pixel units to isolate two pixel units adjacent to each other; and a fingerprint sensor disposed on the second transparent glass layer, and being covered by the black matrix; when the fingerprint sensor is viewed from the top, an area of the fingerprint sensor corresponding to a region of the red sub-pixel is larger than any one of an area of the fingerprint sensor corresponding to a region of the green sub-pixel, an area of the fingerprint sensor corresponding to a region of the blue sub-pixel, and an area of the fingerprint sensor corresponding to a region of the white sub-pixel.

In an example, in the liquid crystal display panel according to the embodiments, the red sub-pixel, the green sub-pixel, the blue sub-pixel, and the white sub-pixel are stacked along a first direction within the same pixel unit; the first direction is a direction pointing outwardly from the black matrix to the pixel unit or a direction pointing inwardly from the pixel unit to the black matrix within a plane parallel to the first transparent glass layer; the red sub-pixel is adjacent to the black matrix.

In an example, in the liquid crystal display panel according to the embodiments, the red sub-pixel, the green sub-pixel, the blue sub-pixel, and the white sub-pixel are arranged in parallel along a second direction within the same pixel unit; the second direction is perpendicular to the first direction, and a plane formed by intersection of the second direction with the first direction is parallel to a plane where the first transparent glass layer is located in FIG. 1; the first direction is a direction pointing outwardly from the black matrix to the pixel unit or a direction pointing inwardly from the pixel unit to the black matrix within a plane parallel to the first transparent glass layer.

In an example, in the liquid crystal display panel according to the embodiments, the red sub-pixel, the green sub-pixel, the blue sub-pixel, and the white sub-pixel are arranged in parallel along a second direction within the same pixel unit, and the red sub-pixel is arranged next to the black matrix; the second direction is perpendicular to the first direction, and a plane formed by intersection of the second direction with the first direction is parallel to a plane where the first transparent glass layer is located in FIG. 1; the first direction is a direction pointing outwardly from the black matrix to the pixel unit or a direction pointing inwardly from the pixel unit to the black matrix within a plane parallel to the first transparent glass layer.

In an example, in the liquid crystal display panel according to the embodiments, in a second direction within the same pixel unit, the red sub-pixel is arranged next to the black matrix, at least one of the green sub-pixel, the blue sub-pixel, and the white sub-pixel is arranged in parallel with the red sub-pixel; the second direction is perpendicular to the first direction, and a plane formed by intersection of the second direction with the first direction is parallel to a plane where the first transparent glass layer is located in FIG. 1; the first direction is a direction pointing outwardly from the black matrix to the pixel unit or a direction pointing inwardly from the pixel unit to the black matrix within a plane parallel to the first transparent glass layer.

In an example, in the liquid crystal display panel according to the embodiments, the red sub-pixel and the green sub-pixel are arranged in parallel in a second direction within the same pixel unit; the second direction is perpendicular to the first direction, and a plane formed by intersection of the second direction with the first direction is parallel to a plane where the first transparent glass layer is located in FIG. 1; the first direction is a direction pointing outwardly from the black matrix to the pixel unit or a direction pointing inwardly from the pixel unit to the black matrix within a plane parallel to the first transparent glass layer; the blue sub-pixel is stacked on any one of the red sub-pixel and the green sub-pixel; the white sub-pixel is stacked on any one of the red sub-pixel and the green sub-pixel.

In an example, in the liquid crystal display panel according to the embodiments, the red sub-pixel, the green sub-pixel, the blue sub-pixel, and the white sub-pixel are arranged in parallel along a second direction within the same pixel unit; the second direction is perpendicular to the first direction, and a plane formed by intersection of the second direction with the first direction is parallel to a plane where the first transparent glass layer is located in FIG. 1; the first direction is a direction pointing outwardly from the black matrix to the pixel unit or a direction pointing inwardly from the pixel unit to the black matrix within a plane parallel to the first transparent glass layer; the fingerprint sensor has a first width and a second width smaller than the first width; when the fingerprint sensor is viewed from the top, the first width corresponds to the red sub-pixel.

In an example, in the liquid crystal display panel according to the embodiments, a width of the red sub-pixel is greater than a width of any one of the green sub-pixel, the blue sub-pixel, and the white sub-pixel in the second direction within the same pixel unit; the second direction is perpendicular to the first direction, and a plane formed by intersection of the second direction with the first direction is parallel to a plane where the first transparent glass layer is located in FIG. 1; the first direction is a direction in which the black matrix points outwardly to the pixel unit or the pixel unit points inwardly to the black matrix within a plane parallel to the first transparent glass layer.

In an example, in the liquid crystal display panel according to the embodiments, the fingerprint sensor includes a photodiode made of an amorphous silicon material.

According to a second aspect of embodiments of the present disclosure, there is provided a smart terminal, including the liquid crystal display panel according to the first aspect and the respective embodiments as described above.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Figure 1:
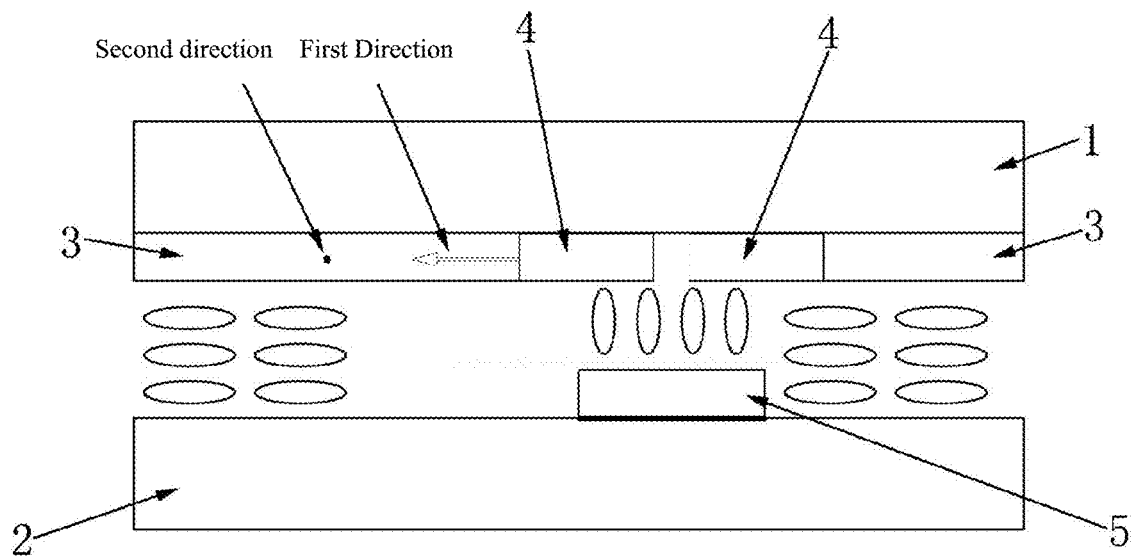
FIG. 1 is a schematic side view of a structure of a liquid crystal display panel illustrated according to an exemplary embodiment.

Description will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The principle and spirit of various embodiments of the present disclosure will be described below with reference to several exemplary embodiments. It should be understood that these embodiments are given only to enable those skilled in the art to better understand and thereby implement the present disclosure, not to limit the scope of the present disclosure in any way.

It should be noted that although the expressions such as "first" and "second" are used herein to describe the different modules, steps, data, etc. of the embodiments of the present disclosure, the expressions such as "first" and "second" are only for the purpose of distinguishing between different modules, steps, data, etc., and do not indicate a specific order or priority. In fact, the expressions such as "first" and "second" can be used interchangeably.

In order to better understand the liquid crystal display panel according to the present disclosure, preferred embodiments of the liquid crystal display panel of the present disclosure will be further described below with reference to the accompanying drawings. The orientation or positional relationship indicated by the terms "center," "longitudinal," "horizontal," "front," "rear," "left," "right," "vertical," "top," "bottom," "inner," "outer," etc. is based on the orientation or positional relationship shown in the drawings, and is only for the convenience of describing the embodiments and simplifying the description, it does not indicate or imply that the device or element referred to must have a specific orientation, must be constructed and operated with a specific orientation, so it cannot be understood as a limitation to the protection scope of the embodiments, and the same reference numerals indicate the same type of structure.

In order to improve use security of smart terminal devices, Liquid Crystal Displays (LCD) may adopt an unlocking way of front scratching or pressing, or the smart terminal devices adopt a back-unlocking manner to achieve functions such as secure fingerprint unlocking, secure application unlocking, etc. For smart terminal devices, the display effect of fingerprint unlocking may be set on the LCD.

The advent of the full-screen era has led to the current flourishing of in-display fingerprint technology. However, due to cost and display issues, at present, the optical fingerprint module is integrated only in the high-end models of OLED screens. Due to the backlight problem for the in-display screen of LCD, which cannot be overcome by the current technique, LCD screen manufacturers are concerned about how to increase the value of LCD screen. Therefore, many LCD screen manufacturers have begun to invest a lot of manpower and money for development, the methods adopted by them are to use the photosensitive fingerprint sensor to acquire fingerprint images.

At present, the in-display fingerprint acquisition of the LCD screen proposed by the LCD display manufacturers may have the following common problems: 1. the optical path scheme affects the display effect; 2. the production complexity is increased; 3. the sensitivity of the photosensitive device is insufficient, the area requirement is large, and the aperture ratio is affected indirectly, the aperture ratio is the one that most affects the displaying, which will greatly reduce the display effect.

Figure 7:
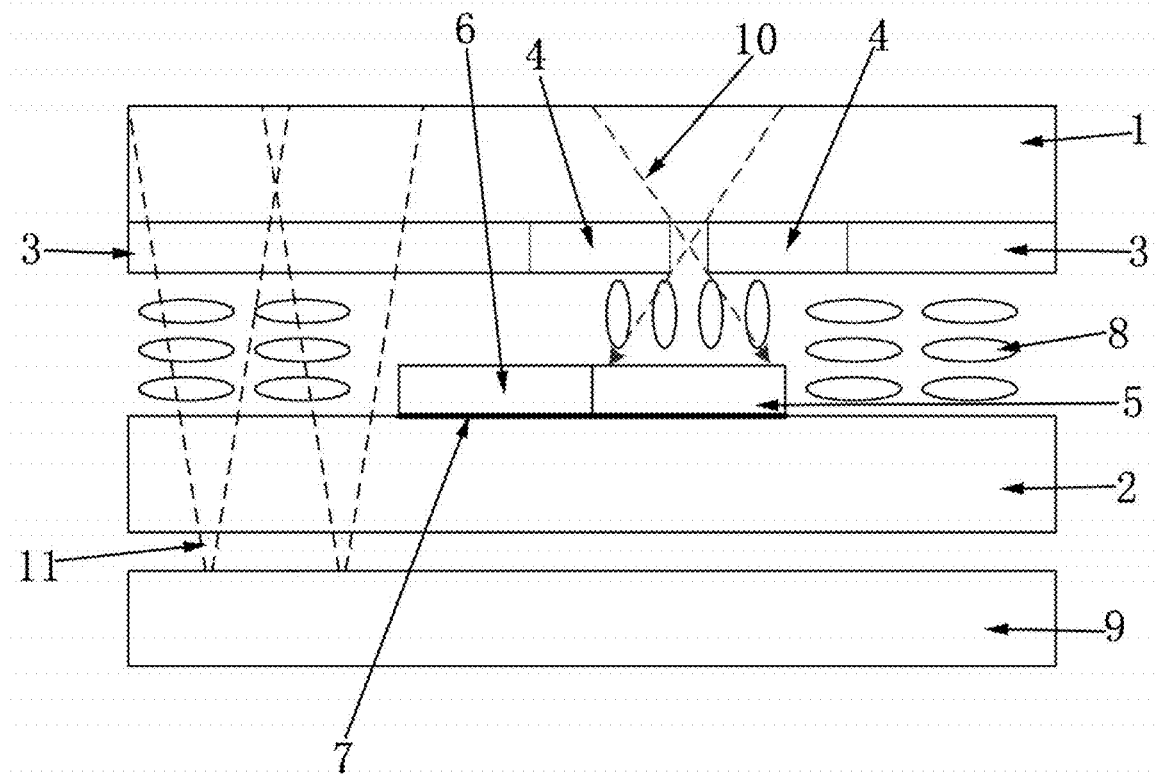
FIG. 7 is a schematic side view of a structure of a liquid crystal display panel illustrated according to some embodiments.

FIG. 7 is a schematic side view of a structure of a liquid crystal display panel according to some embodiments. In FIG. 7, numeral reference 1 represents a first transparent glass layer; numeral reference 2 represents a second transparent glass layer; numeral reference 3 represents a pixel unit of a color filter (CF) layer; numeral reference 4 represents a black matrix (BM); numeral reference 5 represents a fingerprint sensor; numeral reference 6 represents a thin-film transistor (TFT); numeral reference 7 represents a light-shielding layer; numeral reference 8 represents a liquid crystal molecule; numeral reference 9 represents a backlight plate; numeral reference 10 represents an incident light; and numeral reference 11 represents a light outgoing angle.

FIG. 7 illustrates a light path implementation scheme according to some embodiments. The backlight plate 9 emits light, after the light passes through the second transparent glass layer 2 and the liquid crystal molecule 8, it is color-filtered by the pixel unit 3 and irradiates onto the first transparent glass layer 1. The fingerprint is affixed to an upper surface of the first transparent glass layer 1, the light emitted from the backlight plate 9 illuminates the fingerprint. After the fingerprint is illuminated, the brightness at the ridge of the fingerprint is slightly greater than that at the valley of the fingerprint.

The light emitted from the backlight plate 9 forms an incident light 10 at the fingerprint which is at criticality on the upper surface of the first transparent glass layer 1. The incident light 10 is incident on the fingerprint sensor 5. Due to the reduced energy of the light emitted by the backlight plate 9 after being filtered by the pixel unit 3 and the sensitivity factor of the fingerprint sensor 5, the difference between the ridge and the valley of the fingerprint identified by the fingerprint sensor 5 is not obvious. The difference between the incident light 10 at the ridge and the incident light 10 at the valley identified by the fingerprint sensor 5 is relatively small, it is prone to cause light mixing, which renders the fingerprint identified by the fingerprint sensor 5 unclear. Herein, the light mixing is determined based on the brightness of the fingerprint and the sensitivity of the fingerprint sensor 5, and the fingerprint lines recognized by the fingerprint sensor 5 are blurred when the energy difference between the photon energy reflected from the fingerprint ridge to the fingerprint sensor 5 and the photon energy emitted from the fingerprint valley to the fingerprint sensor 5 is relatively small.

The backlight plate 9 can be improved, the direction of the light emitted by the backlight plate 9 is restricted by the light outgoing angle 11, so that the light emitted by the backlight plate 9 can be more concentrated on the fingerprint, thereby increasing the brightness of the fingerprint, and making the difference between the ridge and the valley of the fingerprint more obvious, then the fingerprint sensor 5 can recognize a clearer fingerprint image. In addition to using the light outgoing angle 11 to limit so as to solve the light mixing problem, a collimated light path will also be created in the middle of the black matrix 4 for the incident light 10 reflected from the finger to further reduce the light mixing problem.

Figure 8:
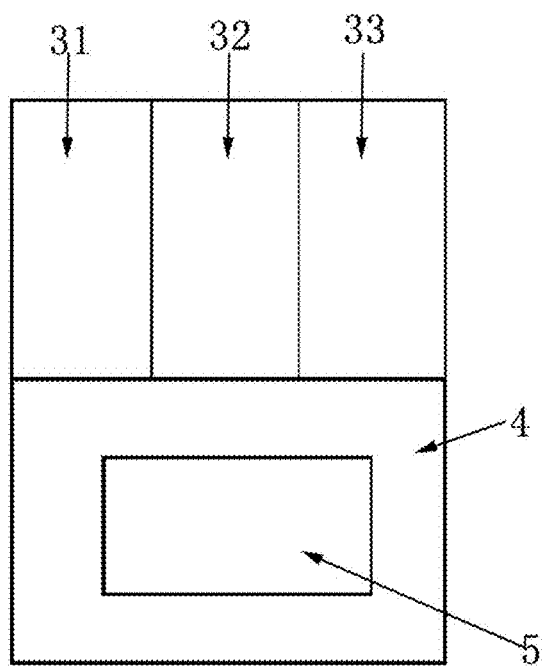
FIG. 8 is a schematic top view of a structure illustrated according to the embodiment shown in FIG. 7.

As shown in FIG. 8, FIG. 8 is a schematic top view of the structure in FIG. 7. In FIG. 8, 31 is a red sub-pixel; 32 is a green sub-pixel; 33 is a blue sub-pixel; due to the sensitivity factor of the fingerprint sensor 5 and the requirement for light shielding, the black matrix 4 needs to be enlarged to cover the entire fingerprint sensor 5.

In addition, the pixel unit 3 also has a problem of stray light. When the light emitted by the backlight plate 9 passes through the pixel unit 3, a part of the light is reflected to the photosensitive sensor 5, and the light reflected by the first transparent glass plate 1 back to the pixel unit 3 is incident on the photosensitive sensor 5 through the pixel unit 3, forming the stray light. In order to avoid disturbing the fingerprint sensor 5, the black matrix 4 needs to be expanded further, the aperture ratio of the pixel unit 3 is also occupied to a certain extent. There is no solution in the related art that can achieve a more optimized design in aperture ratio, brightness, and sensor size.

A first aspect of the embodiments of the present disclosure provides a liquid crystal display panel, which can make improvement to the problem of affecting the LCD display by setting the in-display fingerprint sensor for the LCD screen.

Figure 2:
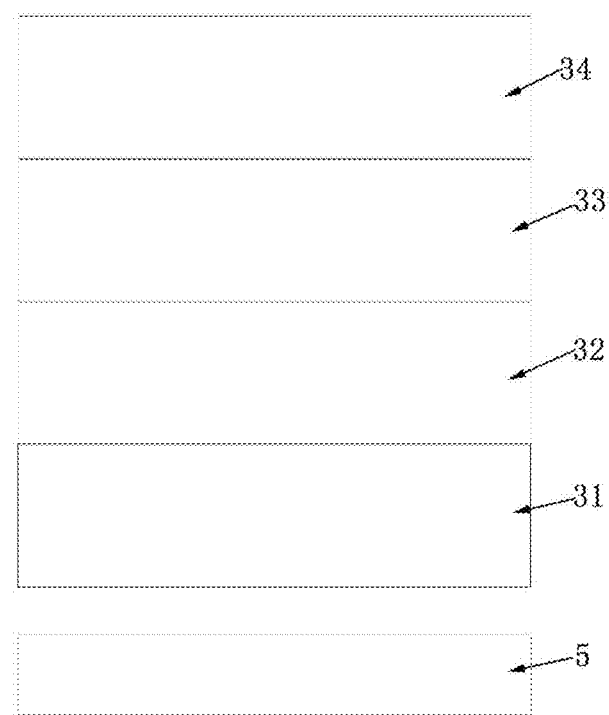
FIG. 2 is a schematic top view of a structure of a liquid crystal display panel illustrated according to the embodiment shown in FIG. 1.

FIG. 1 is a schematic side view of a structure of a liquid crystal display panel according to an exemplary embodiment. FIG. 2 is a schematic top view of a structure of a liquid crystal display panel according to the embodiment shown in FIG. 1.

As shown in FIGS. 1 and 2, the liquid crystal display panel of this embodiment includes a first transparent glass layer 1, a second transparent glass layer 2, two or more pixel units 3, a black matrix 4, and a fingerprint sensor 5.

Herein, the second transparent glass layer 2 overlaps the first transparent glass layer 1.

The two or more pixel units 3 are disposed on a side of the first transparent glass layer 1 opposite to the second transparent glass layer 2. The pixel unit 3 includes a red sub-pixel 31, a green sub-pixel 32, a blue sub-pixel 33, and a white sub-pixel 34 arranged according to a predetermined rule.

The black matrix 4 is disposed between two adjacent pixel units 3 to isolate two pixel units 3 adjacent to each other.

The fingerprint sensor 5 is disposed on the second transparent glass layer 2, and the black matrix 3 covers the fingerprint sensor 5. When the fingerprint sensor 5 is viewed from the top, an area of the fingerprint sensor 5 corresponding to a region of the red sub-pixel 31 is larger than any one of an area of the fingerprint sensor corresponding to a region of the green sub-pixel 32, an area of the fingerprint sensor corresponding to a region of the blue sub-pixel 33, and an area of the fingerprint sensor corresponding to a region of the white sub-pixel 34. That is to say, the area of the fingerprint sensor 5 corresponding to the region of the red sub-pixel 31 is larger than the area of the fingerprint sensor 5 corresponding to the region of the green sub-pixel 32. The area of the fingerprint sensor 5 corresponding to the region of the red sub-pixel 31 is larger than the area of the fingerprint sensor 5 corresponding to the region of the blue sub-pixel 33. The area of the fingerprint sensor 5 corresponding to the region of the red sub-pixel 31 is larger than an area of the fingerprint sensor 5 corresponding to the region of the white sub-pixel 34.

In this embodiment, the direction in which the fingerprint sensor 5 is viewed from the top is a direction from the first transparent glass layer 1 to the second transparent glass layer 2, that is, the direction perpendicular to the first transparent glass layer 1.

Figure 3:
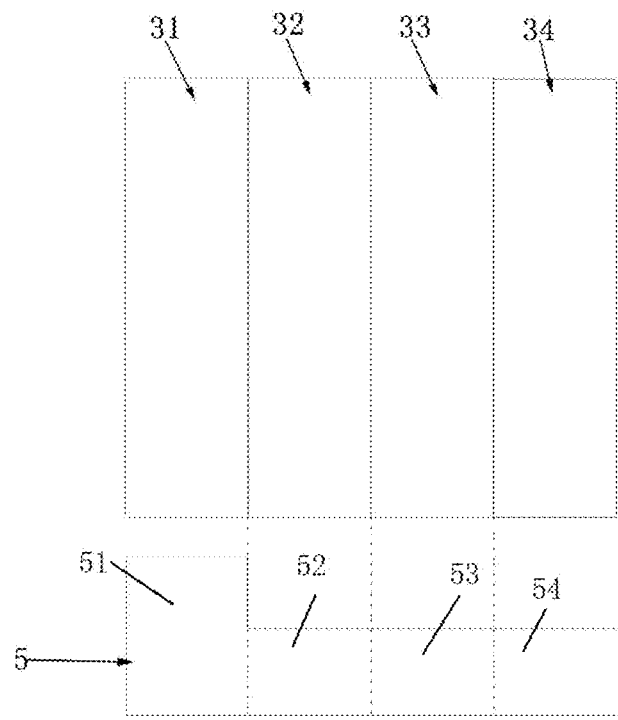
FIG. 3 is a schematic top view of a structure of another liquid crystal display panel illustrated according to the embodiment shown in FIG. 1.

In this embodiment, as shown in FIG. 3, the region corresponding to the red sub-pixel 31 refers to: the region 51 corresponding to the width of the red sub-pixel 31 in the fingerprint sensor 5, when the fingerprint sensor 5 is viewed from the top. The region corresponding to the green sub-pixel 32 refers to: the region 52 corresponding to the width of the green sub-pixel 32 in the fingerprint sensor 5. The region corresponding to the blue sub-pixel 33 refers to: the region 53 corresponding to the width of the blue sub-pixel 33 in the fingerprint sensor 5. The region corresponding to the white sub-pixel 34 refers to: the region 54 corresponding to the width of the white sub-pixel 34 in the fingerprint sensor 5.

The fingerprint sensor 5 may be disposed on the second transparent glass layer 2 below the black matrix 4, and the fingerprint sensor 5 can receive the incident light. The magnitude of the area of the fingerprint sensor 5 can be set according to its required sensitivity. The larger the area of the fingerprint sensor 5 is, the better the sensitivity is. However, if the area of the fingerprint sensor 5 is too large, it will affect the display effect of the display panel.

In order to achieve good shading and avoid color mixing, the black matrix 4 covers the entire fingerprint sensor 5. In addition, the light passing through the pixel unit 3 also generates stray light and interferes with the fingerprint sensor 5. Therefore, the black matrix 4 is further expanded outwardly to avoid stray light from affecting the fingerprint sensor 5. However, as the set area of the black matrix 4 increases, the aperture ratio of the LCD is affected to a certain extent, which in turn affects the display brightness of the LCD.

In the liquid crystal display panel of this embodiment, the white sub-pixel 34 is provided in the pixel unit 3. By providing the white sub-pixel 34 in the pixel unit 3, the light transmittance of the LCD can be increased, and the aperture ratio of the LCD can be raised, thereby improving the display brightness of the LCD.

The fingerprint sensor 5 of this embodiment is installed on a side of the second transparent glass layer 2 facing the first transparent glass layer 1. When viewed from the first transparent glass layer 1 toward the second transparent glass layer 2, the fingerprint sensor 5 is set in a way that the area of the fingerprint sensor 5 corresponding to the region 51 of the red sub-pixel is larger than the area of the fingerprint sensor 5 corresponding to the region 52 of the green sub-pixel 32. The fingerprint sensor 5 is set in a way that the area of the fingerprint sensor 5 corresponding to the region 51 of the red sub-pixel is larger than the area of the fingerprint sensor 5 corresponding to the region 53 of the blue sub-pixel 33. The fingerprint sensor 5 is set in a way that the area of the fingerprint sensor 5 corresponding to the region 51 of the red sub-pixel is larger than the area of the fingerprint sensor 5 corresponding to the region 54 of the white sub-pixel 34. That is, the area of the fingerprint sensor 5 corresponding to the region 51 of the red sub-pixel is larger than any one of the area of the fingerprint sensor 5 corresponding to the region 52 of the green sub-pixel 32, the area of the fingerprint sensor 5 corresponding to the region 53 of the blue sub-pixel 33, and the area of the fingerprint sensor 5 corresponding to the region 54 of the white sub-pixel 34. The above-mentioned design manner for the fingerprint sensor 5 can increase the entire area of the fingerprint sensor 5, enable the fingerprint sensor 5 to accumulate more photons in a continuous period of time, and help the fingerprint sensor 5 to acquire the clearer and more complete fingerprint image, thereby the sensitivity of the fingerprint sensor is improved.

The red light has less interference with the fingerprint sensor 5. In order to avoid the influence of stray light on the fingerprint sensor 5 and increase the area of the fingerprint sensor 5, the fingerprint sensor 5 is set in a way that the area of the region 51 corresponding to the red sub-pixel 31 is larger than any of the area of the fingerprint sensor 5 corresponding to the green sub-pixel 32, the area of the fingerprint sensor 5 corresponding to the blue sub-pixel 33, and the area of the fingerprint sensor 5 corresponding to the white sub-pixel 34.

In the above-described liquid crystal display panel provided in this embodiment, the white sub-pixel 34 is provided in the pixel unit 3. By providing the white sub-pixels 34 in the pixel unit 3, the light transmittance of the LCD can be increased, the aperture ratio of the LCD can be raised, and thus the display brightness of the LCD can be improved. By increasing the area of the fingerprint sensor 5 corresponding to the region of the red sub-pixel 31, the overall area of the fingerprint sensor 5 is increased, the maximum value of the photon capacity that can be accumulated by the fingerprint sensor 5 is improved, and the fingerprint image acquired by the fingerprint sensor 5 can be improved in terms of definition, accuracy, and sensitivity.

In some embodiments, the sub-pixels in the pixel unit 3 can be laid out so that when the liquid crystal display panel is viewed from the top, the red sub-pixels 31 is close to the fingerprint sensor 5. Herein, referring to the fingerprint sensor 5 of FIG. 1, the width of the fingerprint sensor 5 can be increased, and thickness of the fingerprint sensor 5 can also be increased, within an allowable distance between the first transparent glass layer 1 and the second transparent glass layer 2. The layout of the sub-pixels in the pixel unit 3 is exemplarily described below with reference to FIGS. 2 to 5, to increase the area of the fingerprint sensor 5 and improve the sensitivity of the liquid crystal display panel. Herein, each of the pixel sub-units in FIGS. 2 to 5 is an orthographic projection imaging of the pixel unit 3 on the second transparent glass layer 2, and is used to present the horizontal position relationship between the fingerprint sensor 5 and the pixel unit 3 in the liquid crystal display panel shown in FIG. 1. A layer of pixel sub-units is arranged in each pixel unit 3, and the aforesaid pixel sub-units are arranged on the same layer.

In the following embodiments, the first direction and the second direction are perpendicular to each other, and a plane formed by intersection of the first direction and the second direction is parallel to the plane where the first transparent glass layer 1 and the first transparent glass layer 2 are located in FIG. 1.

Herein, the first direction can be a direction pointing outwardly from the black matrix to the pixel unit or pointing inwardly from the pixel unit to the black matrix within a plane parallel to the first transparent glass layer; that is, the direction perpendicular to the vertical frame of the black matrix 4 in FIG. 1, just as indicated by the hollow arrow in FIG. 1. That is, it is the direction from the black matrix 4 on the left in FIG. 1 toward the pixel unit 3 on the left, or the direction from the black matrix 4 on the right in FIG. 1 toward the pixel unit 3 on the right.

The second direction can be a direction perpendicular to a side surface of the liquid crystal display panel shown in FIG. 1, such as the direction of the black solid dot in FIG. 1, this black solid dot points to the inside or outside of the interface shown in FIG. 1. That is, it can be the direction perpendicular to the interface shown in FIG. 1 and toward the inside of the interface, or the direction perpendicular to the interface shown in FIG. 1 and toward the outside of the interface.

Referring to FIG. 2, in some embodiments, within the same pixel unit 3, along the first direction, the red sub-pixel 31, the green sub-pixel 32, the blue sub-pixel 33, and the white sub-pixels 34 are stacked; the first direction is a direction pointing outwardly from the black matrix 4 to the pixel unit 3, or a direction pointing inwardly from the pixel unit 3 to the black matrix 4 within a plane parallel to the first transparent glass layer; and the red sub-pixel 31 is adjacent to the black matrix 4.

There is no restriction on the stacking order of the red sub-pixel 31, the green sub-pixel 32, the blue sub-pixel 33, and the white sub-pixel 34, as long as it is satisfied that the red sub-pixel 31 is adjacent to the black matrix 4, the stacking order of the remaining sub-pixels can be arbitrarily set.

FIG. 3 is a schematic top view of a structure of another liquid crystal display panel according to the embodiment shown in FIG. 1. As shown in FIG. 3, in some embodiments, within the same pixel unit 3, the red sub-pixel 31, the green sub-pixel 32, the blue sub-pixel 33, and the white sub-pixels 34 are arranged in parallel along a second direction; the second direction is perpendicular to the first direction, and a plane formed by intersection of the second direction with the first direction is parallel to a plane where the first transparent glass layer 1 is located in FIG. 1; the first direction is a direction pointing outwardly from the black matrix 4 to the pixel unit 3, or a direction pointing inwardly from the pixel unit 3 to the black matrix 4 within a plane parallel to the first transparent glass layer.

In the embodiment shown in the above FIG. 3, the fingerprint sensor 5 can be divided into a region 51 corresponding to the red sub-pixel 31, a region 52 corresponding to the green sub-pixel 32, a region 53 corresponding to the blue sub-pixel 33, and a region 54 corresponding to the white sub-pixel 34. As shown in FIG. 3, the area of the region 51 corresponding to the red sub-pixel 31 is larger than the area of the region 52 corresponding to the green sub-pixel 32. As shown in FIG. 3, the width of the region 51 corresponding to the red sub-pixel 31 and the width corresponding to the green sub-pixel 32 can be the same. However, the region 51 corresponding to the red sub-pixel 31 is closer to the red sub-pixel 31, when compared to any one of the region 52 corresponding to the green sub-pixel 32, the region 53 corresponding to the blue sub-pixel 33, and the region 54 corresponding to the white sub-pixel 34. That is, the length of the region 51 corresponding to the red sub-pixel 31 is larger than the length of the region 52 corresponding to the green sub-pixel 32, the length of the region 53 corresponding to the blue sub-pixel 33, and the length of the region 54 corresponding to the white sub-pixel 34. Therefore, the area of the region 51 corresponding to the red sub-pixel 31 is larger than the area of the region 52 corresponding to the green sub-pixel 32. The area of the region 51 corresponding to the red sub-pixel 31 is larger than the area of the region 53 corresponding to the blue sub-pixel 33. The area of the region 51 corresponding to the red sub-pixel 31 is larger than the area of the region 54 corresponding to the white sub-pixel 34.

However, the present disclosure is not limited thereto, the width of the region 51 corresponding to the red sub-pixel 31 can be made to be larger than the width of the region 52 corresponding to the green sub-pixel 32, thereby realizing that the area of the region 51 corresponding to the red sub-pixel 31 is larger than the area of the region 52 corresponding to the green sub-pixel 32. Similarly, the width of the region 51 corresponding to the red sub-pixel 31 can be made to be larger than the width of the region 53 corresponding to the blue sub-pixel 33, or larger than the width of the region 54 corresponding to the white sub-pixel 34. As a result, the area of the fingerprint sensor 5 near to the red sub-pixel 31 is increased.

Figure 4:
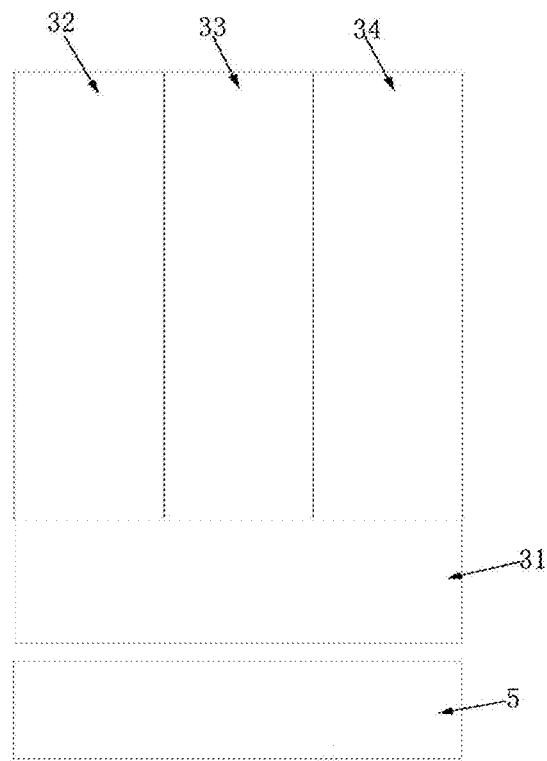
FIG. 4 is a schematic top view of a structure of yet another liquid crystal display panel illustrated according to the embodiment shown in FIG. 1.

FIG. 4 is a schematic top view of a structure of still another liquid crystal display panel according to the embodiment shown in FIG. 1. As shown in FIG. 4, in some other embodiments, the red sub-pixel 31, the green sub-pixel 32, the blue sub-pixel 33, and the white sub-pixels 34 are arranged in parallel along a second direction within the same pixel unit 3, and the red sub-pixel 31 is disposed next to the black matrix 4; the second direction is perpendicular to the first direction, and a plane formed by intersection of the second direction with the first direction is parallel to the plane on which the transparent glass layer 1 is located in FIG. 1; the first direction is a direction pointing outwardly from the black matrix 4 to the pixel unit 3 or a direction points inwardly from the pixel unit 3 to the black matrix 4 within a plane parallel to the first transparent glass layer 1.

In yet other embodiments, in a second direction within the same pixel unit 3, the red sub-pixel 4 is disposed next to the black matrix 4, and at least one of the green sub-pixel 32, the blue sub-pixel 33, and the white sub-pixel 34 is arranged in parallel with the red sub-pixel 31; the second direction is perpendicular to the first direction, and a plane formed by intersection of the second direction with the first direction is parallel to the plane on which the transparent glass layer 1 is located in FIG. 1; the first direction is a direction pointing outwardly from the black matrix 4 to the pixel unit 3, or a direction pointing inwardly from the pixel unit 3 to the black matrix 4 within a plane parallel to the first transparent glass layer 1.

In yet other embodiments, in a second direction within the same pixel unit 3, the red sub-pixel 31 and the green sub-pixel 32 are arranged in parallel; the second direction is perpendicular to the first direction, and a plane formed by intersection of the second direction with the first direction is parallel to the plane on which the transparent glass layer 1 is located in FIG. 1; the first direction is a direction pointing outwardly from the black matrix 4 to the pixel unit 3 or pointing inwardly from the pixel unit 3 to the black matrix 4 within a plane parallel to the first transparent glass layer 1; the blue sub-pixel 33 is stacked on any one of the red sub-pixel 31 and the green sub-pixel 32; and the white sub-pixel 34 is stacked on any one of the red sub-pixel 31 and the green sub-pixel 32.

Figure 5:
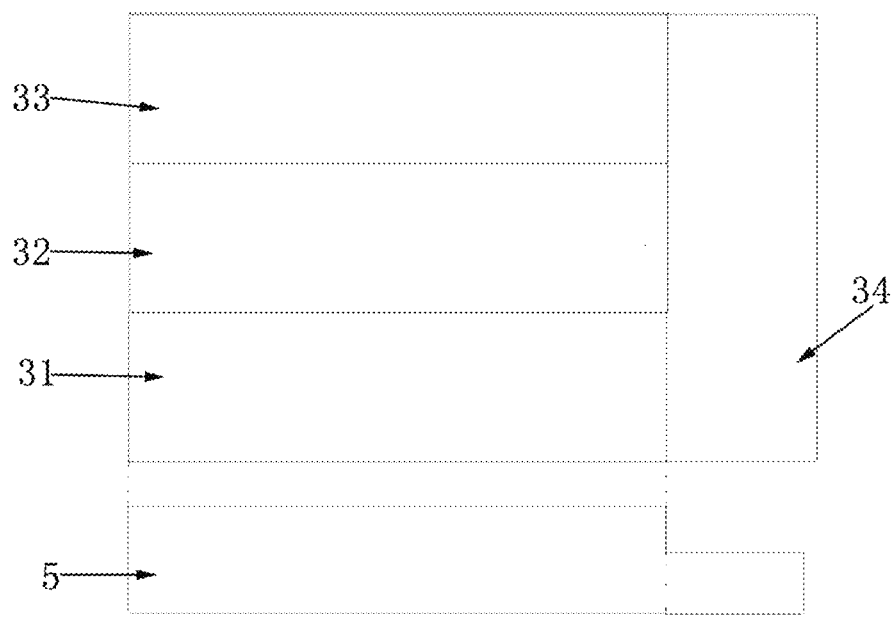
FIG. 5 is a schematic top view of a structure of still yet another liquid crystal display panel illustrated according to the embodiment shown in FIG. 1.

FIG. 5 is a schematic top view of a structure of yet another liquid crystal display panel according to the embodiment shown in FIG. 1. As shown in FIG. 5, in some embodiments, the red sub-pixel 31, the green sub-pixel 32, the blue sub-pixel 33, and the white sub-pixel 34 are arranged in parallel along a second direction within the same pixel unit 3; the second direction is perpendicular to the first direction, and a plane formed by intersection of the second direction with the first direction is parallel to the plane on which the transparent glass layer 1 is located in FIG. 1; the first direction is a direction pointing outwardly from the black matrix 4 to the pixel unit 3 or pointing inwardly from the pixel unit 3 to the black matrix 4 within a plane parallel to the first transparent glass layer 1; the fingerprint sensor 5 has a first width and a second width smaller than the first width; and when the fingerprint sensor 5 is viewed from the top, the first width corresponds to the red sub-pixel 31.

In some other embodiments, in the second direction within the same pixel unit 3, the width of the red sub-pixel 31 is larger than the width of any one of the green sub-pixel 32, the blue sub-pixel 33, and the white sub-pixel 34. The second direction is perpendicular to the first direction, and a plane formed by intersection of the second direction with the first direction is parallel to the plane on which the transparent glass layer 1 is located in FIG. 1; the first direction is a direction pointing outwardly from the black matrix 4 to the pixel unit 3 or pointing inwardly from the pixel unit 3 to the black matrix 4 within a plane parallel to the first transparent glass layer 1.

The layout of the red sub-pixel 31, the green sub-pixel 32, the blue sub-pixel 33, and the white sub-pixel 34 in the pixel unit 3 in the above manner can increase the area of the fingerprint sensor 5, and the fingerprint sensor 5 with increased area is less affected by stray light. The definition and accuracy of the fingerprint image acquired by the fingerprint sensor 5 is increased, thereby the sensitivity of the liquid crystal display panel is improved.

Figure 6:
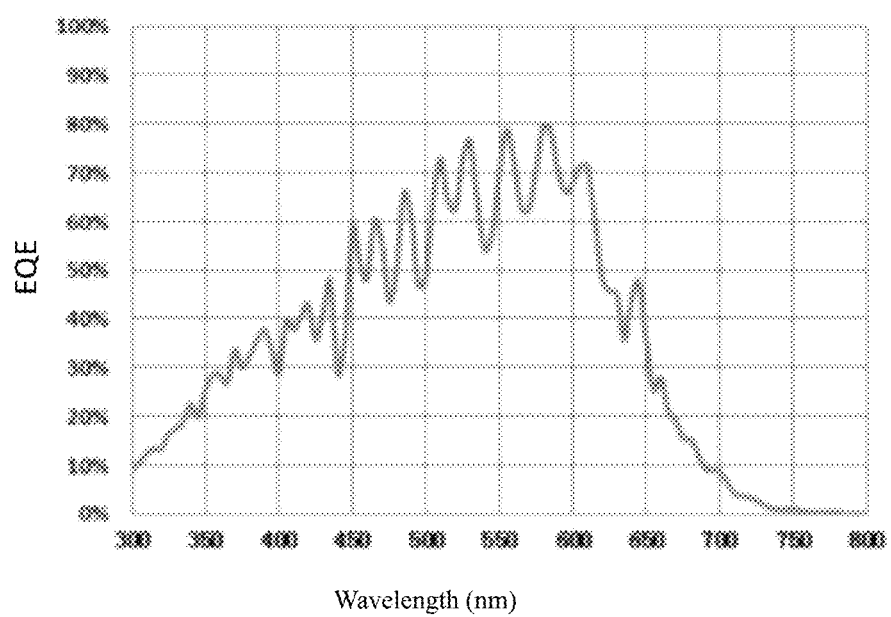
FIG. 6 is a graph illustrating an external quantum efficiency of a photodiode made of an amorphous silicon material.

In some embodiments, the fingerprint sensor 5 includes a photodiode made of an amorphous silicon material. FIG. 6 is a graph of an external quantum efficiency of a photodiode made of an amorphous silicon material. The photodiode in this embodiment can be a PIN diode. According to the data obtained from the external quantum efficiency (EQE) test on the fingerprint sensor 5 made of the above material, it can be known that the response of the fingerprint sensor 5 to red light (>650 nm) is less sensitive, and thus this characteristic can be used to increase the effective area of the fingerprint sensor 5 by placing it in an area where the red light has a larger influence. The use of the fingerprint sensor 5 made of an amorphous silicon material can effectively improve the influence of the light transmitted by the red sub-pixel 31 on the fingerprint sensor 5. The area of the fingerprint sensor 5 corresponding to the region of the red sub-pixel 31 of the fingerprint sensor 5 is made larger than the area of any of the region corresponding to the green sub-pixel 32, the region corresponding to the blue sub-pixel 33, and the region corresponding to the white sub-pixel 34, which can increase the design area of the fingerprint sensor 5 and further improve the fingerprint performance of the liquid crystal display panel.

The red sub-pixel 31, the green sub-pixel 32, the blue sub-pixel 33, and the white sub-pixel 34 in the pixel unit are laid out according to the above embodiments, through which, the area of the region of the fingerprint sensor 5 corresponding to the red sub-pixel 31 is increased, which enables a coordinated and optimized design of the aperture ratio, brightness of the liquid crystal display panel and the area of the fingerprint sensor 5, and effectively improves the fingerprint performance of the liquid crystal display panel.

According to another aspect of the embodiments of the present disclosure, a smart terminal is provided, the smart terminal is provided with the liquid crystal display panel provided in the first aspect and in each embodiment described above. The display brightness, aperture ratio, and area of the fingerprint sensor 5 of the smart terminal can be effectively improved by providing the above liquid crystal display panel such that the fingerprint performance of the smart terminal can be optimized.

Various embodiments of the present disclosure can include one or more of the following advantages. The display brightness and aperture ratio of the liquid crystal display panel can be improved by adding the white sub-pixel to the pixel unit. By increasing the area of the fingerprint sensor corresponding to the sub-pixel that is not sensitive, the area of the overall fingerprint sensor can be increased, the area of the fingerprint sensor can be increased, and thus the sensitivity of the fingerprint sensor of the liquid crystal display panel is improved.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A liquid crystal display panel, comprising:
   a first transparent glass layer;
   a second transparent glass layer overlapping the first transparent glass layer;
   two or more pixel units disposed on a side of the first transparent glass layer opposing the second transparent glass layer, each of the pixel units including a red sub-pixel, a green sub-pixel, a blue sub-pixel, and a white sub-pixel arranged in accordance with a predetermined rule;
   a black matrix disposed between the pixel units to isolate two pixel units adjacent to each other; and
   a fingerprint sensor disposed on the second transparent glass layer, and covered by the black matrix;
   wherein
   the fingerprint sensor is divided into a region corresponding to the red sub-pixel, a region corresponding to the green sub-pixel, a region corresponding to the blue sub-pixel, and a region corresponding to the white sub-pixel;
   an area of the region corresponding to the red sub-pixel is larger than an area of any one of the region corresponding to the green sub-pixel, the region corresponding to the blue sub-pixel, and the region corresponding to the white sub-pixel; and
   the region corresponding to the red sub-pixel is closer to the red sub-pixel, when compared to any one of the region corresponding to the green sub-pixel, the region corresponding to the blue sub-pixel, and the region corresponding to the white sub-pixel.

2. The liquid crystal display panel according to claim 1, wherein
   the red sub-pixel, the green sub-pixel, the blue sub-pixel, and the white sub-pixel are stacked along a first direction within the same pixel unit; the first direction is one of a direction pointing outwardly from the black matrix to the pixel unit and a direction pointing inwardly from the pixel unit to the black matrix within a plane parallel to the first transparent glass layer; and
   the red sub-pixel is adjacent to the black matrix.

3. The liquid crystal display panel according to claim 1, wherein
   the red sub-pixel, the green sub-pixel, the blue sub-pixel, and the white sub-pixel are arranged in parallel along a second direction within the same pixel unit;
   the second direction is perpendicular to the first direction, and a plane formed by intersection of the second direction with the first direction is parallel to a plane where the first transparent glass layer is located; and
   the first direction is one of a direction pointing outwardly from the black matrix to the pixel unit and a direction pointing inwardly from the pixel unit to the black matrix within a plane parallel to the first transparent glass layer.

4. The liquid crystal display panel according to claim 1, wherein
   the red sub-pixel, the green sub-pixel, the blue sub-pixel, and the white sub-pixel are arranged in parallel along a second direction within the same pixel unit, and the red sub-pixel is arranged next to the black matrix;
   the second direction is perpendicular to the first direction, and a plane formed by intersection of the second direction with the first direction is parallel to a plane where the first transparent glass layer is located; and
   the first direction is one of a direction pointing outwardly from the black matrix to the pixel unit and a direction pointing inwardly from the pixel unit to the black matrix within a plane parallel to the first transparent glass layer.

5. The liquid crystal display panel according to claim 1, wherein
   in a second direction within the same pixel unit, the red sub-pixel is arranged next to the black matrix, at least one of the green sub-pixel, the blue sub-pixel, and the white sub-pixel is arranged in parallel with the red sub-pixel;
   the second direction is perpendicular to the first direction, and a plane formed by intersection of the second direction with the first direction is parallel to a plane where the first transparent glass layer is located; and
   the first direction is one of a direction pointing outwardly from the black matrix to the pixel unit and a direction pointing inwardly from the pixel unit to the black matrix within a plane parallel to the first transparent glass layer.

6. The liquid crystal display panel according to claim 1, wherein
   the red sub-pixel and the green sub-pixel are arranged in parallel in a second direction within the same pixel unit;
   the second direction is perpendicular to the first direction, and a plane formed by intersection of the second direction with the first direction is parallel to a plane where the first transparent glass layer is located;
   the first direction is one of a direction pointing outwardly from the black matrix to the pixel unit and a direction pointing inwardly from the pixel unit to the black matrix within a plane parallel to the first transparent glass layer;
   the blue sub-pixel is stacked on any one of the red sub-pixel and the green sub-pixel; and
   the white sub-pixel is stacked on any one of the red sub-pixel and the green sub-pixel.

7. The liquid crystal display panel according to claim 1, wherein
   the red sub-pixel, the green sub-pixel, the blue sub-pixel, and the white sub-pixel are arranged in parallel along a second direction within the same pixel unit;
   the second direction is perpendicular to the first direction, and a plane formed by intersection of the second direction with the first direction is parallel to a plane where the first transparent glass layer is located;

the first direction is one of a direction pointing outwardly from the black matrix to the pixel unit and a direction pointing inwardly the pixel unit to the black matrix within a plane parallel to the first transparent glass layer;

the fingerprint sensor has a first width and a second width smaller than the first width; and when the fingerprint sensor is viewed form the top, the first width corresponds to the red sub-pixel.

8. The liquid crystal display panel according to claim 1, wherein width of the red sub-pixel is greater than a width of any one of the green sub-pixel, the blue sub-pixel, and the white sub-pixel in the second direction within the same pixel unit;

the second direction is perpendicular to the first direction, and a plane formed by intersection of the second direction with the first direction is parallel to a plane where the first transparent glass layer is located; and the first direction is one of a direction pointing outwardly from the black matrix to the pixel unit and a direction pointing inwardly from the pixel unit to the black matrix within a plane parallel to the first transparent glass layer.

9. The liquid crystal display panel according to claim 1, wherein the fingerprint sensor includes a photodiode made of an amorphous silicon material.

10. A smart terminal, comprising the liquid crystal display panel according to claim 1.

11. The smart terminal according to claim 10, wherein the red sub-pixel, the green sub-pixel, the blue sub-pixel, and the white sub-pixel are stacked along a first direction within the same pixel unit; the first direction is one of a direction pointing outwardly from the black matrix to the pixel unit and a direction pointing inwardly from the pixel unit to the black matrix within a plane parallel to the first transparent glass layer; and the red sub-pixel is adjacent to the black matrix.

12. The smart terminal according to claim 10, wherein the red sub-pixel, the green sub-pixel, the blue sub-pixel, and the white sub-pixel are arranged in parallel along a second direction within the same pixel unit;

the second direction is perpendicular to the first direction, and a plane formed by intersection of the second direction with the first direction is parallel to a plane where the first transparent glass layer is located; and the first direction is one of a direction pointing outwardly from the black matrix to the pixel unit and a direction pointing inwardly from the pixel unit to the black matrix within a plane parallel to the first transparent glass layer.

13. The smart terminal according to claim 10, wherein the red sub-pixel, the green sub-pixel, the blue sub-pixel, and the white sub-pixel are arranged in parallel along a second direction within the same pixel unit, and the red sub-pixel is arranged next to the black matrix;

the second direction is perpendicular to the first direction, and a plane formed by intersection of the second direction with the first direction is parallel to a plane where the first transparent glass layer is located; and the first direction is one of a direction pointing outwardly from the black matrix to the pixel unit and a direction pointing inwardly from the pixel unit to the black matrix within a plane parallel to the first transparent glass layer.

14. The smart terminal according to claim 10, wherein in a second direction within the same pixel unit, the red sub-pixel is arranged next to the black matrix, at least one of the green sub-pixel, the blue sub-pixel, and the white sub-pixel is arranged in parallel with the red sub-pixel;

the second direction is perpendicular to the first direction, and a plane formed by intersection of the second direction with the first direction is parallel to a plane where the first transparent glass layer is located; and the first direction is one of a direction pointing outwardly from the black matrix to the pixel unit and a direction pointing inwardly from the pixel unit to the black matrix within a plane parallel to the first transparent glass layer.

15. The smart terminal according to claim 10, wherein the red sub-pixel and the green sub-pixel are arranged in parallel in a second direction within the same pixel unit;

the second direction is perpendicular to the first direction, and a plane formed by intersection of the second direction with the first direction is parallel to a plane where the first transparent glass layer is located;

the first direction is one of a direction pointing outwardly from the black matrix to the pixel unit and a direction pointing inwardly from the pixel unit to the black matrix within a plane parallel to the first transparent glass layer;

the blue sub-pixel is stacked on any one of the red sub-pixel and the green sub-pixel; and the white sub-pixel is stacked on any one of the red sub-pixel and the green sub-pixel.

16. The smart terminal according to claim 10, wherein the red sub-pixel, the green sub-pixel, the blue sub-pixel, and the white sub-pixel are arranged in parallel along a second direction within the same pixel unit;

the second direction is perpendicular to the first direction, and a plane formed by intersection of the second direction with the first direction is parallel to a plane where the first transparent glass layer is located;

the first direction is one of a direction pointing outwardly from the black matrix to the pixel unit and a direction pointing inwardly the pixel unit to the black matrix within a plane parallel to the first transparent glass layer;

the fingerprint sensor has a first width and a second width smaller than the first width; and when the fingerprint sensor is viewed form the top, the first width corresponds to the red sub-pixel.

17. The smart terminal according to claim 10, wherein a width of the red sub-pixel is greater than a width of any one of the green sub-pixel, the blue sub-pixel, and the white sub-pixel in the second direction within the same pixel unit;

the second direction is perpendicular to the first direction, and a plane formed by intersection of the second direction with the first direction is parallel to a plane where the first transparent glass layer is located; and the first direction is one of a direction pointing outwardly from the black matrix to the pixel unit and a direction pointing inwardly from the pixel unit to the black matrix within a plane parallel to the first transparent glass layer.

18. A mobile terminal comprising the display panel according to claim 1; wherein the white sub-pixel is arranged in the pixel unit in accordance with the predetermined rule such that display brightness and aperture ratio of the liquid crystal display panel are improved.

19. The mobile terminal according to claim 18, wherein the liquid crystal display panel is configured to have improved sensitivity by increasing an overall area of the fingerprint sensor can be increased.

20. The mobile terminal according to claim 19, wherein the overall area of the fingerprint sensor is increased by increasing the area of the fingerprint sensor corresponding to the red sub-pixel, which is less sensitive than other sub-pixels.

\* \* \* \* \*